United States Patent
Goranson et al.

(10) Patent No.: US 7,908,357 B2
(45) Date of Patent: Mar. 15, 2011

(54) METHODS AND SYSTEMS FOR DETECTING ABNORMAL DIGITAL TRAFFIC

(75) Inventors: Craig A. Goranson, Kennewick, WA (US); John R. Burnette, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 1304 days.

(21) Appl. No.: 11/231,565

(22) Filed: Sep. 21, 2005

(65) Prior Publication Data

US 2007/0067438 A1    Mar. 22, 2007

(51) Int. Cl.
*G06F 15/16*    (2006.01)

(52) U.S. Cl. .......................................... 709/224; 709/223

(58) Field of Classification Search .......... 709/223–229; 706/46; 702/182; 704/252; 705/1–38; 707/100; 713/201; 726/23
See application file for complete search history.

(56) References Cited

U.S. PATENT DOCUMENTS

| | | | | |
|---|---|---|---|---|
| 5,465,321 | A * | 11/1995 | Smyth | 706/20 |
| 6,041,350 | A * | 3/2000 | Takimoto | 709/223 |
| 6,363,421 | B2 * | 3/2002 | Barker et al. | 709/223 |
| 6,405,318 | B1 | 6/2002 | Rowland | |
| 6,415,276 | B1 * | 7/2002 | Heger et al. | 706/52 |
| 6,601,054 | B1 * | 7/2003 | Lo et al. | 706/30 |
| 6,711,615 | B2 | 3/2004 | Porras et al. | |
| 6,772,349 | B1 | 8/2004 | Martin et al. | |
| 7,127,743 | B1 * | 10/2006 | Khanolkar et al. | 726/23 |
| 2002/0035698 | A1 | 3/2002 | Malan et al. | |
| 2002/0059078 | A1 * | 5/2002 | Valdes et al. | 705/1 |
| 2002/0188864 | A1 | 12/2002 | Jackson | |
| 2003/0009698 | A1 * | 1/2003 | Lindeman et al. | 713/201 |
| 2003/0110396 | A1 | 6/2003 | Lewis et al. | |
| 2003/0139905 | A1 * | 7/2003 | Helsper et al. | 702/182 |
| 2003/0212646 | A1 * | 11/2003 | Horvitz | 706/46 |
| 2003/0212903 | A1 | 11/2003 | Porras et al. | |
| 2004/0002776 | A1 * | 1/2004 | Bickford | 700/30 |
| 2005/0108377 | A1 * | 5/2005 | Lee et al. | 709/223 |
| 2005/0267754 | A1 * | 12/2005 | Schultz et al. | 704/252 |
| 2006/0067216 | A1 * | 3/2006 | Lalonde et al. | 370/230 |
| 2006/0067240 | A1 * | 3/2006 | Kim et al. | 370/242 |
| 2006/0101402 | A1 * | 5/2006 | Miller et al. | 717/124 |
| 2006/0149848 | A1 * | 7/2006 | Shay | 709/229 |
| 2006/0212584 | A1 * | 9/2006 | Yu et al. | 709/227 |

(Continued)

FOREIGN PATENT DOCUMENTS

WO    WO 03/067810 A1    8/2003

OTHER PUBLICATIONS

Lee, Priors for Neural Networks, Classification, Clustering, and Data Mining Applications, 2004, pp. 141-150.

(Continued)

*Primary Examiner* — Bunjob Jaroenchonwanit
(74) *Attorney, Agent, or Firm* — Allan C. Tuan

(57) ABSTRACT

Aspects of the present invention encompass methods and systems for detecting abnormal digital traffic by assigning characterizations of network behaviors according to knowledge nodes and calculating a confidence value based on the characterizations from at least one knowledge node and on weighting factors associated with the knowledge nodes. The knowledge nodes include a characterization model based on prior network information. At least one of the knowledge nodes should not be based on fixed thresholds or signatures. The confidence value includes a quantification of the degree of confidence that the network behaviors constitute abnormal network traffic.

22 Claims, 10 Drawing Sheets

U.S. PATENT DOCUMENTS

| | | | |
|---|---|---|---|
| 2006/0271564 A1* | 11/2006 | Meng Muntz et al. | 707/100 |
| 2006/0293777 A1* | 12/2006 | Breitgand et al. | 700/108 |
| 2007/0043656 A1* | 2/2007 | Lancaster | 705/38 |
| 2007/0180526 A1* | 8/2007 | Copeland, III | 726/23 |
| 2007/0192863 A1* | 8/2007 | Kapoor et al. | 726/23 |

OTHER PUBLICATIONS

The Security Benefits of a Behavior-Based Intrusion Detection System, Lancope Technical White Paper, 2002.

Peakflow X product by Arbor Networks, Inc. (http://www.arbornetworks.com/products_x.php).

Sorenson, Competitive Overview of Statistical Anomaly Detection, Juniper Networks Solution Brief, 2004.

Fratto, Anomaly-Detection Services: Know thy enemy, Feb. 18, 2004, (http://nwc.securitypipeline.com/howto/17602432).

Winning the battle against false positives, Stonesoft Corporation white paper, Oct. 2003.

Intrusion Detection and Prevention: Protecting your network from attacks, NetScreen Technologies, Inc whitepaper, 2003.

Know your enemy: Statistics, The Honeypot Project, Jul. 22, 2001 (http://www.honeynet.org/papers/stats).

Know your enemy: Honeynets, The Honeypot Project, Nov. 12, 2003 (http://www.honeynet.org/papers/honeynet/index.html).

* cited by examiner

METHODS AND SYSTEMS FOR DETECTING ABNORMAL DIGITAL TRAFFIC

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

With the expansion of, and increased reliance on, computer networks and the internet, the relative threat of malicious activity has increased. Given the value of the information traveling across such networks, loss of data and/or operational capabilities can be very costly to the owners and administrators of the network. Therefore, a great deal of effort is expended on identifying abnormal and/or malicious activities in a quick and efficient manner, which can allow for rapid response.

Many of the current techniques rely on characterizations of traffic flow or traffic content (e.g. payload) and can result in an excessive number of false positives and/or undetected events. Therefore, a need exists for a fast and accurate method and system for detecting abnormal digital traffic.

SUMMARY

Typically, a majority of the traffic traversing a digital network comprises normal and successful behavior because the connections are established by processes and users that are already familiar with their respective network and servers. However, this is not commonly true of intruders and malware, which can generate significant amounts of unsuccessful and/or abnormal network behavior. Embodiments of the present invention analyze the traffic traversing a network and detect network behaviors that likely constitute abnormal network traffic.

One such embodiment encompasses a method comprising the steps of assigning characterizations of network behaviors according to knowledge nodes, and calculating a confidence value based on both the characterizations from at least one knowledge node and the weighting factors associated with the knowledge nodes. The knowledge nodes comprise a characterization model based on prior network information. At least one of the knowledge nodes should not be based on fixed thresholds or signatures. The confidence value comprises a quantification of the degree of confidence that the network behaviors constitute abnormal network traffic.

Another embodiment encompasses a system comprising sensors to detect network events, a program on a computer-readable medium, and a processing device to execute the program, wherein a network behavior comprises at least one network event. The program comprises at least one knowledge node to assign characterizations of network behaviors and at least one hypothesis node to calculate a confidence value based on the characterizations from at least one knowledge node. Each knowledge node comprises a characterization model based on prior network information. At least one of the knowledge nodes is not based on fixed thresholds or signatures. Each hypothesis node comprises weighting factors for associated knowledge nodes. The confidence value comprises a quantification of the degree of confidence that the network behaviors constitute abnormal network traffic.

Prior to the assigning of characterizations, sensors can detect network events, which network events can compose network behaviors. Sensors can include, but are not limited to, signature-based sensors, network anomaly sensors, protocol anomaly sensors and combinations thereof.

The detected events can be organized using a device for aggregating a plurality of network events. The aggregating means can comprise a processing device that receives data from the sensors and can prefilter and normalize data into an appropriate format for analysis by the analysis engine. In one embodiment, there can be one aggregator for each knowledge node.

Alternatively, or in addition, some embodiments of the present invention can further comprise classifying network traffic as approved or unapproved. The classification can be based on information including, but not limited to, source data, destination data, connection state, traffic data flow, or combinations thereof. In such an instance, only unapproved network traffic is analyzed according to the methods and systems described in the present disclosure. By only evaluating unapproved network behavior, the volume of traffic to be analyzed can be reduced significantly, which can improve detection and response times.

Furthermore, network behaviors can be logged and stored in a memory storage device. In one embodiment, network behavior logging can involve "collecting" network events from the sensors using processor-based device having memory that can store the event logs. Memory can include, but is not limited to RAM, disk-based devices, flash memory, and combinations thereof. Logging can occur after network events have been aggregated. The logs can enable an administrator to review the performance of a detection system that employs the present method. When appropriate, the administrator can also refine the characterization model based on the prior network information contained in the logs. For example, the administrator can confirm and/or reject characterizations assigned by the knowledge node, thereby refining the models. Furthermore, the administrator can alter the confidence value based on his/her judgment and the network behavior logs. Thus, knowledge nodes can be refined according to the accumulation of prior network information and administrator feedback.

A security action can be performed when the confidence value is greater than or equal to an alert value. The alert value can be predefined by an administrator. Examples of security actions can include, but are not limited to, notifying administrators, collecting forensic data, establishing a quarantine for offending systems, transferring offending systems to a virtual network, suspending user access, and combinations thereof. Means for performing security actions in response to abnormal network traffic can include a server that serves relevant alert data to communication means including, but not limited to cell phones, Blackberries, and email. Another server can cause suspension of the offending user's network access by terminating remote network access via dialup modem or virtual private network, or by disabling local network access by disabling or restricting access to a network switch port.

Knowledge nodes can each comprise models that are associated with at least one network behavior. Instances of such models can include, but are not limited to failed connect egress, failed connect ingress, success MSPorts, failed simple mail transfer protocol (SMTP), peer-to-peer (P2P) ports, failed connect intranet, and success SMTP. Therefore, in one embodiment, each knowledge node can comprise a characterization model associated with a specific network behavior. In one embodiment, the characterization model utilizes decision making techniques from engineering statistics. As new network behaviors are discovered and as existing behaviors are altered, the definition and organization of knowledge nodes can be adapted appropriately. Accordingly, the specific knowledge nodes described herein are intended to be examples and not limitations in the scope of the present invention.

Calculation of the confidence values can be performed by hypothesis nodes. The hypothesis nodes can be associated with at least one knowledge node, which can thereby specify a particular type of abnormal traffic for each hypothesis node. For example, if it is known that P2P traffic typically involves connections and/or failed connection attempts to particular transmission control protocol (TCP) ports, a P2P hypothesis node can be associated with P2P-ports and failed-connect-egress knowledge nodes. Examples of abnormal traffic can comprise, but are not limited to portscans, P2P, viruses, MS walking, and SMTP storm. An additional hypothesis node can comprise an Alert (unknown) hypothesis node for uncategorized, abnormal traffic. In one embodiment, calculation of the confidence values is based on a modified Bayesian analysis and takes into account all combinations of the characterizations assigned by those knowledge nodes as well as the weighting factors associated with those knowledge nodes.

DESCRIPTION OF DRAWINGS

Embodiments of the invention are described below with reference to the following accompanying drawings.

DETAILED DESCRIPTION

For a clear and concise understanding of the specification and claims, including the scope given to such terms, the following definitions are provided.

As used herein, approved network traffic can refer to events and/or behaviors that have been defined in a set of policies and/or rules.

Network events can comprise single instances of network activity. Examples can include, but are not limited to, a connection attempt to a particular internet protocol (IP) address and/or port, dropped connections, transmission or reception of email, authentication failure, connection attempts to unused and/or unallowed IP addresses, and access attempts to network resources that are not associated with production use. In contrast, network behaviors can comprise at least one network event. Examples of network behaviors can include, but are not limited to repeated failed connections, portscans, repeated failure to send SMTP mail, traffic that is heavily biased in one direction (e.g., outbound or inbound), peer-to-peer protocol usage, repeated failed authentication attempts, and high ratios of failed connections to successful connections.

Figure 1:
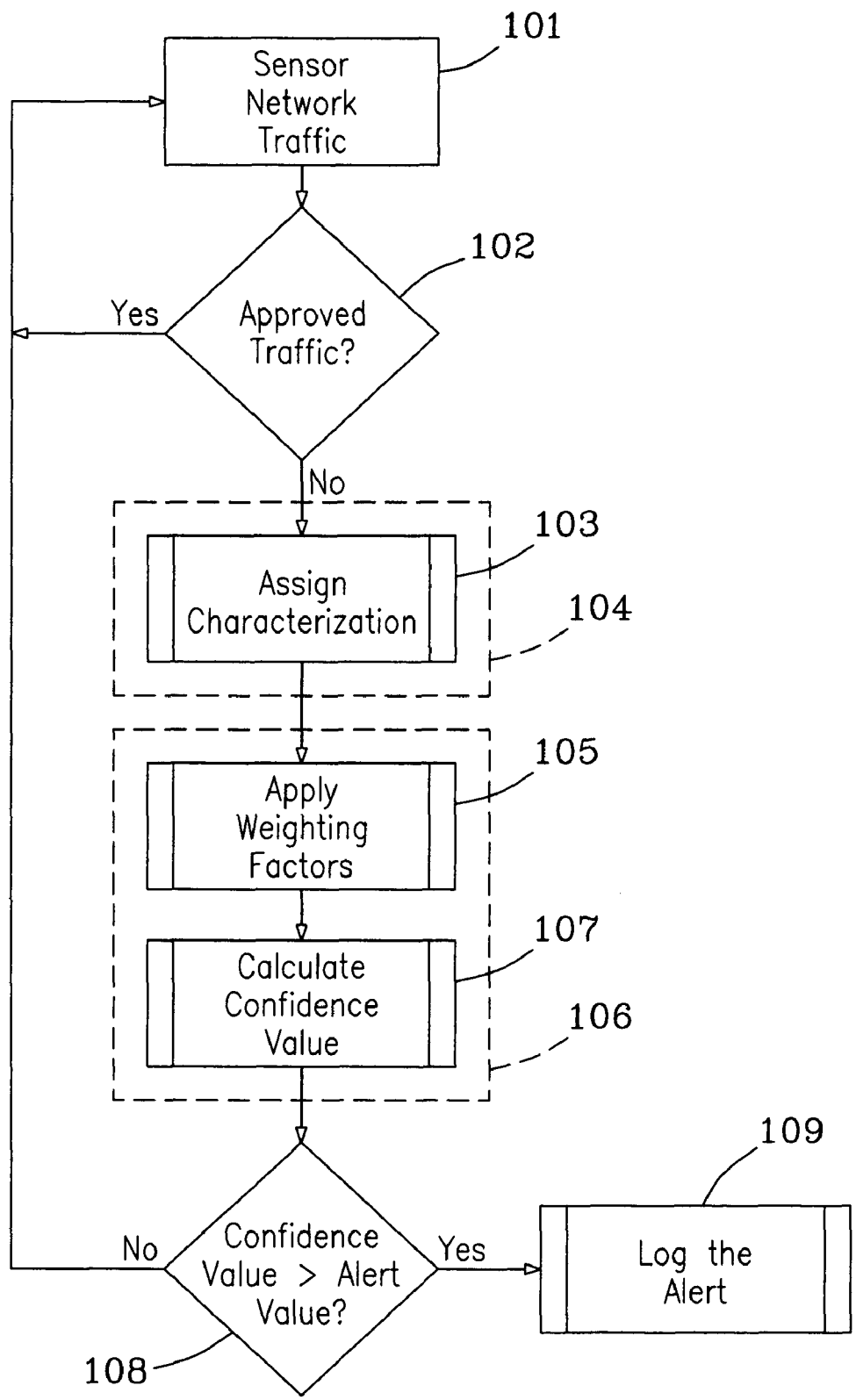
FIG. 1 is a flowchart depicting an embodiment of a method for detecting abnormal network traffic.

FIG. 1 shows a flowchart describing a method encompassed by an embodiment of the present invention. Network events and behaviors detected by sensors 101 are evaluated for categorization as approved or unapproved 102. Approved behaviors, which likely constitute a majority of network traffic, are not further analyzed in order to preserve network resources. Unapproved network behaviors are assigned a characterization 103 according to the characterization model of relevant knowledge nodes 104. A hypothesis node 106 can then apply a weighting factor 105 to the characterization and calculate a confidence value 107, wherein the weighting factors are associated with specific knowledge nodes. The characterization models, the relationships between network behaviors and knowledge nodes, and the weighting factors associated with each knowledge node can be initially defined by network administrators according to prior network information and are described below in greater detail. If the confidence value for a particular network behavior is greater than an alert value 108, then a log can be created 109.

Figure 2:
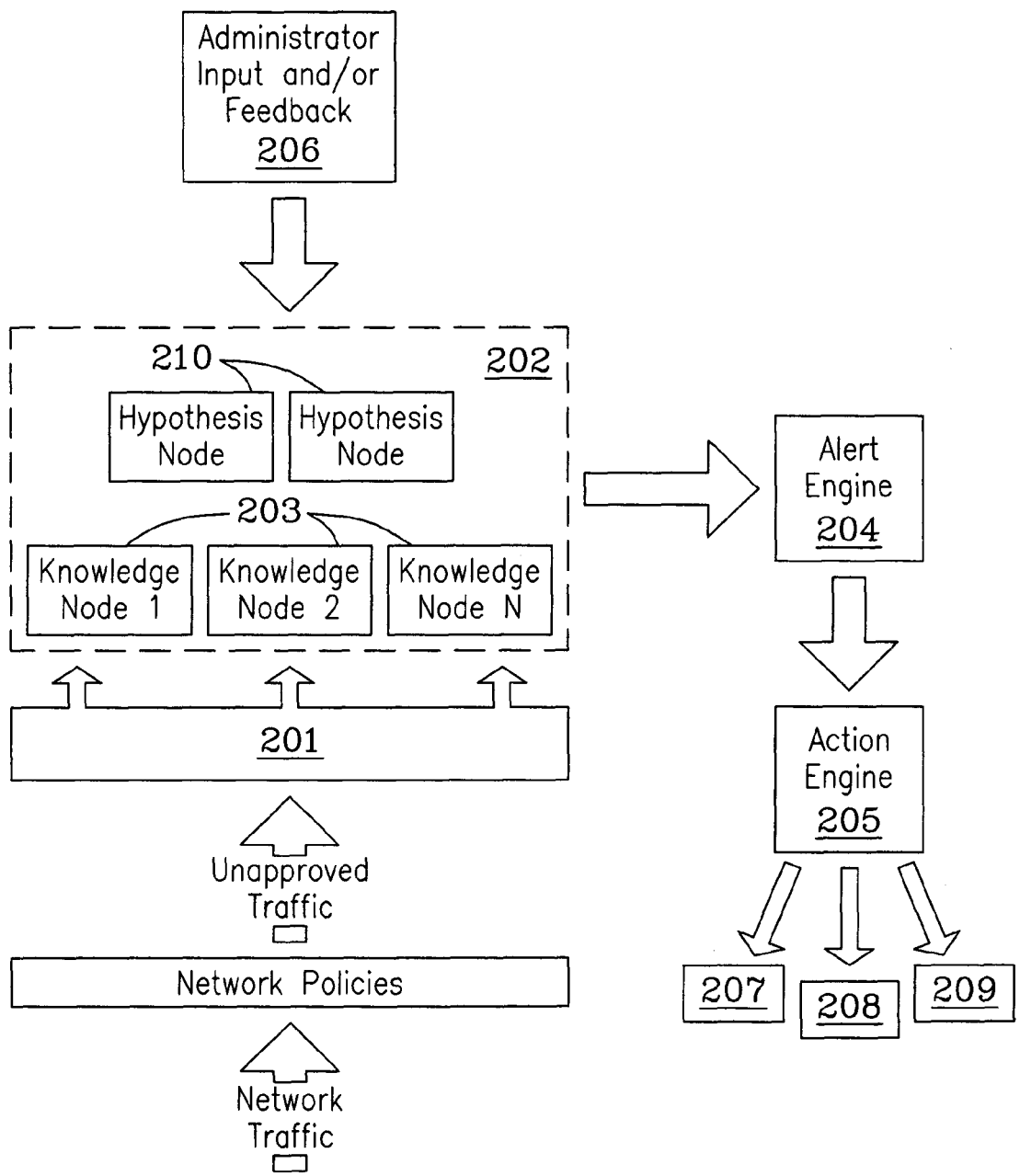
FIG. 2 is a diagram of an embodiment of the overall architecture of a system for detecting abnormal network traffic.

In one embodiment, referring to FIG. 2, network events can be aggregated by a network event classifier 201 prior to being analyzed by the knowledge nodes 203. Aggregated events can be logged. The knowledge nodes can be part of an analysis engine 202 that also comprises hypothesis nodes 210. Network behaviors that constitute instances of abnormal traffic, as determined by the analysis engine, can elicit a response from an alert engine 204 and an action engine 205. The alert engine 204 can send notification of the abnormal traffic to appropriate personnel such as network administrators 206. Operations of the alert engine and action engine can occur sequentially, wherein either the notification or the security action occurs first, or they can occur substantially simultaneously.

Figure 3:
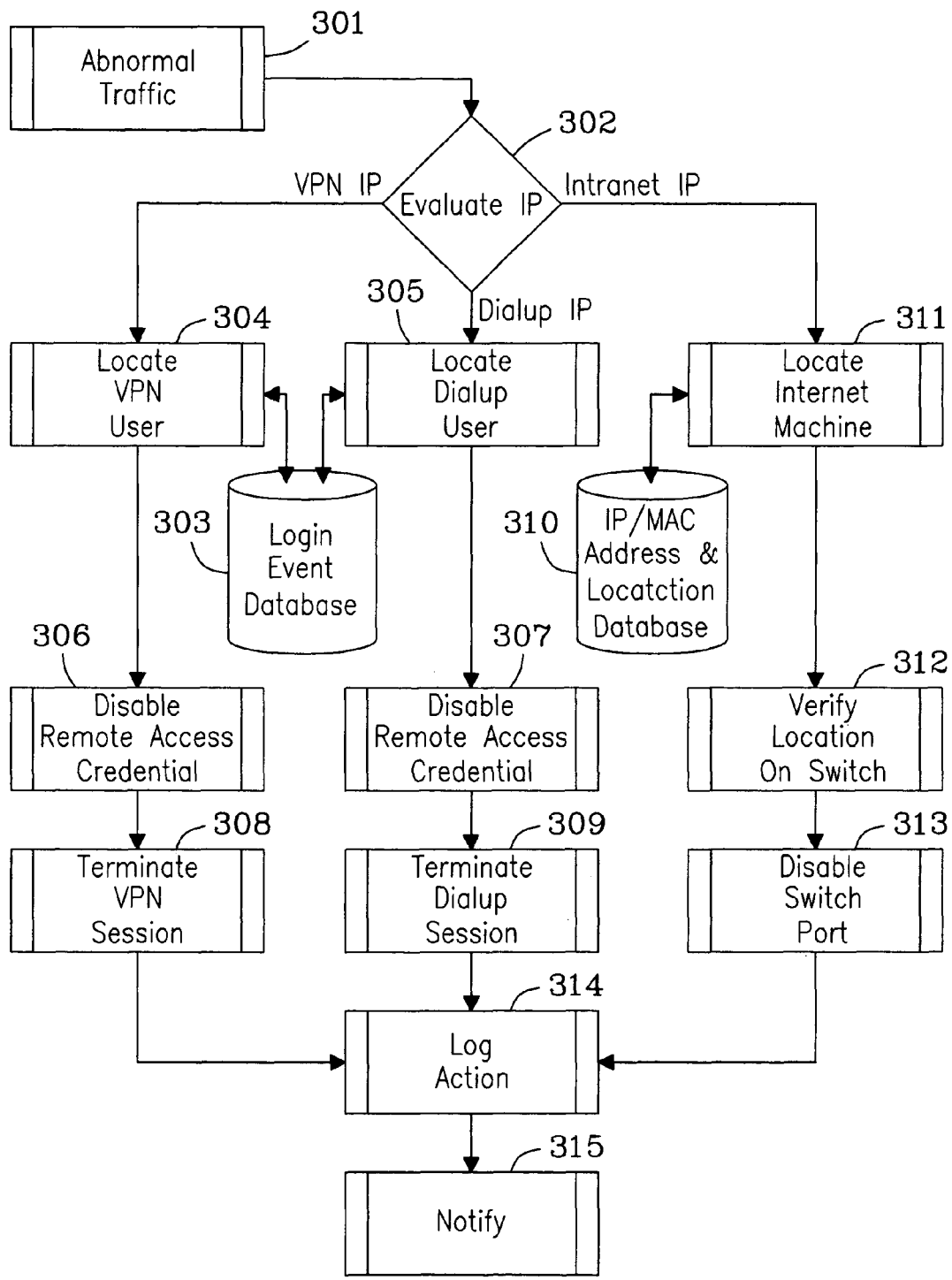
FIG. 3 is a flowchart of an embodiment of an action engine response.

The action engine 205 can perform security actions, which can affect, for example, virtual private network (VPN) 209, dialup 207, and/or intranet IP connections 207. FIG. 3 is a flowchart showing an embodiment for terminating user access and/or network sessions. When particular network behaviors and/or events are determined to be abnormal and security actions are warranted 301, the action engine can evaluate the IP address 302 of the offending system. Addresses associated with VPN and dialup connections can be compared to a login event database 303 to locate/identify the user of the offending system 304, 305 and disable the user's remote access credential 306, 307. The VPN and/or dialup session can then be terminated 308, 309 to eliminate any additional abnormal/malicious traffic from the offending system. Similarly, for systems locate/identify the offending intranet machine 311. The system's location can be verified on the switch 312 and then the switch port can be disabled 313, thereby terminating the system's network access. In each case, the security action can be logged 314 and the appropriate administrator notified 315.

Referring again to FIG. 2, in some embodiments, the administrator 206 can provide feedback to the analysis engine, which feedback can be utilized to adapt and/or refine the characterization models and weighting factors of the knowledge and hypothesis nodes, respectively. Thus, for example, an administrator can confirm or reject assignments from knowledge nodes and/or associations from hypothesis nodes based on logged information or at the time of notification. Furthermore, the administrator can adjust parameters in the characterization models.

Initial definition of the characterization models of each knowledge node can be defined by administrators. The characterization model can comprise a range of certainty intervals that measure the deviation from a typical volume of a particular network activity. In one embodiment, the typical volume of a particular network activity can be characterized from prior network information by the mean and standard deviation. Each certainty interval can be correlated with a probability value that indicates the likelihood that the given activity either does or does not constitute the specific activity associated with that particular knowledge node. For example, the P2P knowledge node "hypothesizes" that a particular type of network behavior exists (i.e., P2P is "true") and the probability values assigned by the knowledge node represents the confidence in the fact that the hypothesis is valid. The probability value can be determined statistically, or it can be assigned according to prior network knowledge and/or an administrator's expert opinion.

One way to determine the certainty intervals can be according to equation 1, $$C_{max} = \text{mean} + (\text{standard deviation} \times Z) \qquad \text{Eqn. 1}$$

wherein, $C_{max}$ represents the maximum value for a given certainty interval, mean is the average value calculated from prior network information, standard deviation is the standard deviation calculated from prior network information, and Z is a calculation constant that is taken from a Z table for Standard Normal distributions, an example of such a table is provided in Table 1. While this example utilizes a standard normal distribution, the present invention is not limited thereto and other distributions can be similarly utilized.

TABLE 1

Z values for Standard Normal distribution.

| Z | .00 | .01 | .02 | .03 | .04 | .05 | .06 | .07 | .081 | .09 |
|---|---|---|---|---|---|---|---|---|---|---|
| .0 | .5000 | .4960 | .4920 | .4880 | .4840 | .4801 | .4761 | .4721 | .4681 | .4641 |
| .1 | .4602 | .4562 | .4522 | .4483 | .4443 | .4404 | .4364 | .4325 | .4286 | .4247 |
| .2 | .4207 | .4168 | .4129 | .4090 | .4052 | .4013 | .3974 | .3936 | .3897 | .3859 |
| .3 | .3821 | .3783 | .3745 | .3707 | .3669 | .3632 | .3594 | .3557 | .3520 | .3483 |
| .4 | .3446 | .3409 | .3372 | .3336 | .3300 | .3264 | .3228 | .3192 | .3156 | .3121 |
| .5 | .3085 | .3050 | .3015 | .2981 | .2946 | .2912 | .2877 | .2843 | 2.810 | .2776 |
| .6 | .2743 | .2709 | .2676 | .2643 | .2611 | .2578 | .2546 | .2514 | 2.483 | .2451 |
| .7 | .2420 | .2389 | .2358 | .2327 | .2296 | .2266 | .2236 | .2206 | .2177 | .2148 |
| .8 | .2119 | .2090 | .2061 | .2033 | .2005 | .1977 | .1949 | .1922 | .1894 | .1867 |
| .9 | .1841 | .1814 | .1788 | .1762 | .1736 | .1711 | .1685 | .1660 | .1635 | .1611 |
| 1.0 | .1587 | .1562 | .1539 | .1515 | .1492 | .1469 | .1446 | .1423 | .1401 | .1379 |
| 1.1 | .1357 | .1335 | .1314 | .1292 | .1271 | .1251 | .1230 | .1210 | .1190 | .1170 |
| 1.2 | .1151 | .1131 | .1112 | .1093 | .1075 | .1056 | .1038 | .1020 | .1003 | .0985 |
| 1.3 | .0968 | .0951 | .0934 | .0918 | .0901 | .0885 | .0869 | .0853 | .0838 | .0823 |
| 1.4 | .0808 | .0793 | .0778 | .0764 | .0749 | .0735 | .0721 | .0708 | .0694 | .0681 |
| 1.5 | .0668 | .0655 | .0643 | .0630 | .0618 | .0606 | .0594 | .0582 | .0571 | .0559 |
| 1.6 | .0548 | .0537 | .0526 | .0516 | .0505 | .0495 | .0485 | .0475 | .0465 | .0455 |
| 1.7 | .0446 | .0436 | .0427 | .0418 | .0409 | .0401 | .0392 | .0384 | .0375 | .0367 |
| 1.8 | .0359 | .0351 | .0344 | .0336 | .0329 | .0322 | .0314 | .0307 | .0301 | .0294 |
| 1.9 | .0287 | .0281 | .0274 | .0268 | .0262 | .0256 | .0250 | .0244 | .0239 | .0233 |
| 2.0 | .0228 | .0222 | .0217 | .0212 | .0207 | .0202 | .0197 | .0192 | .0188 | .0183 |
| 2.1 | .0179 | .0174 | .0170 | .0166 | .0162 | .0158 | .0154 | .0150 | .0146 | .0143 |
| 2.2 | .0139 | .0136 | .0132 | .0129 | .0125 | .0122 | .0119 | .0116 | .0113 | .0110 |
| 2.3 | .0107 | .0104 | .0102 | .0099 | .0096 | .0094 | .0091 | .0089 | .0087 | .0084 |
| 2.4 | .0082 | .0080 | .0078 | .0075 | .0073 | .0071 | .0069 | .0068 | .0066 | .0064 |
| 2.5 | .0062 | .0060 | .0059 | .0057 | .0055 | .0054 | .0052 | .0051 | .0049 | .0048 |
| 2.6 | .0047 | .0045 | .0044 | .0043 | .0041 | .0040 | .0039 | .0038 | .0038 | .0036 |
| 2.7 | .0035 | .0034 | .0033 | .0032 | .0031 | .0030 | .0029 | .0028 | .0027 | .0026 |
| 2.8 | .0026 | .0025 | .0024 | .0023 | .0023 | .0022 | .0021 | .0021 | .0020 | .0019 |
| 2.9 | .0019 | .0018 | .0018 | .0017 | .0016 | .0016 | .0015 | .0015 | .0014 | .0014 |
| 3.0 | .0013 | .0013 | .0013 | .0012 | .0012 | .0011 | .0011 | .0011 | .0010 | .0010 |
| 3.1 | .0010 | .0009 | .0009 | .0009 | .0008 | .0008 | .0008 | .0008 | .0007 | .0007 |

A confidence interval is bound by a value, $P_{max}$, which can be defined as the percentage threshold for a confidence interval. The Z constant can be determined from the Table 1 by the determination Of $P_{value}$, where:

$$P_{value} = (1 - P_{max})/2 \qquad \text{Eqn. 2}$$

Once $P_{value}$ is known for a desired confidence interval, the Z value can be looked up according to the specific column/row in which the $P_{value}$ resides in the Z Table. Using this technique, a $C_{max}$ can be calculated for each $P_{max}$ value according to equations 1 and 2 and the appropriate Z value. Table 2 shows examples of Z values that correspond to particular $P_{max}$ values. Alternatively, the certainty intervals can be defined and/or adjusted by an administrator according to prior network knowledge.

TABLE 2

An example of Z values that correspond with the given $P_{maxmax}$ values.

| $P_{max}$ | Z | $C_{max}$ |
|---|---|---|
| 0.99 | 2.601 | $C_{max99}$ = mean + (standard deviation × 2.601) |
| 0.95 | 1.972 | $C_{max95=}$ = mean + (standard deviation × 1.972) |
| 0.90 | 1.653 | $C_{max90=}$ = mean + (standard deviation × 1.653) |
| 0.75 | 1.154 | $C_{max75=}$ = mean + (standard deviation × 1.154) |

The specific knowledge nodes described below are intended to be examples, wherein the certainty intervals are calculated according to equations 1 and 2, and should not limit the scope of the present invention.

Failed Connect Egress:

The Failed Connect Egress knowledge node measures the number of failed connections per interval for intranet nodes establishing connections to the internet. The prior network information for this node comprises data collected from sensors, which is used to determine the average number of failed connections from an intranet to the internet. A standard deviation can also be calculated. Using the mean and standard deviation from the prior network information, certainty intervals, into which measured failed connect egresses can fall, can be determined. Each interval can have an associated probability for the node that characterizes the given network behavior. Thus, the assignment of a characterization to a network behavior, as mentioned earlier, can comprise determining and assigning a characterization that the network behavior is a failed connect egress, which characterization can comprise a probability value. While an actual knowledge node would have much finer interval spacing, Table 3 provides an example of the certainty intervals for failed connect egress.

TABLE 3

An example of the certainty intervals for a failed connect egress knowledge node. M is the measured value of failed connections per interval.

| | Certainty Range | | | | |
|---|---|---|---|---|---|
| | $M < C_{max75}$ | $C_{max75} < M < C_{max90}$ | $C_{max90} < M < C_{max95}$ | $C_{max95} < M < C_{max99}$ | $C_{max99} < M$ |
| Probability (Node) | 0.2 | 0.4 | 0.5 | 0.6 | 0.9 |

Failed Connect Ingress

The Failed Connect Ingress knowledge node measures failed connections per interval for internet nodes establishing connections to the intranet nodes. The connection attempts can occur through an external firewall. The prior network information for this node comprises data collected from sensors, which is used to determine the average number of failed connections from the internet to an intranet. A standard deviation can also be calculated. Using the mean and standard deviation from the prior network information, certainty intervals can be created into which failed connect ingresses can fall. While an actual knowledge node would have much finer interval spacing, Table 4 provides an example of the certainty intervals for failed connect ingress.

TABLE 4

An example of the certainty intervals for a failed connect ingress knowledge node. M is the measured value of failed connections per interval.

| | Certainty Range | | | | |
|---|---|---|---|---|---|
| | $M < C_{max75}$ | $C_{max75} < M < C_{max90}$ | $C_{max90} < M < C_{max95}$ | $C_{max95} < M < C_{max99}$ | $C_{max99} < M$ |
| Probability (Node) | 0.2 | 0.4 | 0.5 | 0.6 | 0.75 |

P2P Ports

The P2P Ports knowledge node represents a true-false evaluation of destination ports used for connections. It can comprise a table, which can be stored in memory, of TCP and/or UDP ports that are known to be associated with P2P applications. In this knowledge node, the probability can be based on the TCP/UDP port that is found and the certainty value for which the port use constitutes a P2P session. The P2P prior network information might not be learned from the network, but can be set from a P2P port table. An example of such a table is shown if Table 5. The port for the attempted connection can then be compared to the ports in the P2P port table in order to determine a probability value. Ports that don't match a P2P port and protocol listed in the table can be given a default probability value.

TABLE 5

An example of a P2P port table.

| Port | Protocol | Probability (Node) |
|---|---|---|
| 33033 | UDP | 0.95 |
| 1214 | TCP | 0.90 |
| 1214 | UDP | 0.90 |
| 6257 | TCP | 0.95 |

Failed SMTP

The Failed SMTP knowledge node measures failed attempts to send SMTP email. This knowledge node is most successful when a network utilizes mail gateways and prevents users from sending mail directly to the internet. Prior network information for this node comprises data collected from sensors, which is used to determine the average number of failed connections on SMTP port 25 from the intranet to any recipient. The standard deviation can also be calculated. Using the mean and standard deviation from the prior network information, certainty intervals can be created into which failed SMTP events can fall. While an actual knowledge node would have much finer interval spacing, Table 6 provides an example of the certainty intervals for failed SMTP.

TABLE 6

An example of the certainty intervals for a failed SMTP knowledge node. M is the measured value of failed connections per interval.

| | Certainty Range | | | | |
|---|---|---|---|---|---|
| | $M < C_{max75}$ | $C_{max75} < M < C_{max90}$ | $C_{max90} < M < C_{max95}$ | $C_{max95} < M < C_{max99}$ | $C_{max99} < M$ |
| Probability (Node) | 0.2 | 0.4 | 0.5 | 0.6 | 0.9 |

Success SMTP

The Success SMTP knowledge node measures the number of successful TCP connections on port 25 in order to monitor the number of SMTP emails that are successfully sent. Large deviations from the normal email volumes can indicate machines that are being used for spam and/or virus propagation. Prior network information for this node comprises data collected from sensors, which is used to determine the average number of failed connections on SMTP port 25 from the intranet to any recipient. The standard deviation can also be calculated. Using the mean and standard deviation from the prior network information, certainty intervals can be created into which successful SMTP events can fall. While an actual knowledge node would have much finer interval spacing, Table 7 provides an example of the certainty intervals for successful SMTP.

TABLE 7

An example of the certainty intervals for a successful SMTP knowledge node. M is the measured value of failed connections per interval.

| | Certainty Range | | | | |
|---|---|---|---|---|---|
| | $M < C_{max75}$ | $C_{max75} < M < C_{max90}$ | $C_{max90} < M < C_{max95}$ | $C_{max95} < M < C_{max99}$ | $C_{max99} < M$ |
| Probability (Node) | 0.2 | 0.4 | 0.5 | 0.6 | 0.85 |

Failed Connect Intranet

The Failed Connect Intranet knowledge node measures failed connections per interval for intranet nodes establishing connections to other intranet nodes. It can be used to detect portscans and port probes inside the intranet. The prior network information for this node comprises data collected from sensors, which is used to determine the average number of failed connections within an intranet. A standard deviation can also be calculated. Using the mean and standard deviation from the prior network information, certainty intervals can be created into which failed connect intranet events can fall. While an actual knowledge node would have much finer interval spacing, Table 8 provides an example of the certainty intervals for failed connect intranet.

TABLE 8

An example of the certainty intervals for a failed connect intranet knowledge node. M is the measured value of failed connections per interval.

| | Certainty Range | | | | |
|---|---|---|---|---|---|
| | $M < C_{max75}$ | $C_{max75} < M < C_{max90}$ | $C_{max90} < M < C_{max95}$ | $C_{max95} < M < C_{max99}$ | $C_{max99} < M$ |
| Probability (Node) | 0.2 | 0.4 | 0.5 | 0.6 | 0.75 |

Failed MSPorts

The failed MSPorts knowledge node looks for failed connections to ports typically associated with Microsoft Windows Operating Systems®. The knowledge node is geared towards detecting viruses and/or worms that attempt to exploit Windows® systems through vulnerabilities on Microsoft Windows® specific ports. The Failed MSPorts prior network information is not learned from the network, but can be set from a MSPorts table. An example of such a table is shown in Table 9. The port for the attempted connection can then be compared to the ports in the MSPorts table in order to determine a probability value. Ports that don't match a MSPorts and protocol listed in the table can be given a default probability value.

TABLE 9

An example of an MSPorts table.

| Port | Protocol | Probability (Node) |
|---|---|---|
| 445 | TCP | 0.2 |
| 139 | TCP | 0.4 |
| 135 | TCP | 0.5 |
| 135 | UDP | 0.6 |
| 137 | UDP | 0.5 |

Success MSPorts

The success MSPorts knowledge node looks for successful connections to ports typically associated with Microsoft Windows Operating Systems®. The knowledge node is geared towards detecting viruses and/or worms that attempt to exploit Windows® system through vulnerabilities on Microsoft Windows® specific ports. The Success MSPorts prior network information might not be learned from the network, but can be set from a MSPorts table. An example of such a table is shown if Table 9. The port for the attempted connection can then be compared to the ports in the MSPorts table in order to determine a probability value. Ports that don't match a MSPorts and protocol listed in the table can be given a default probability value.

Figure 4:
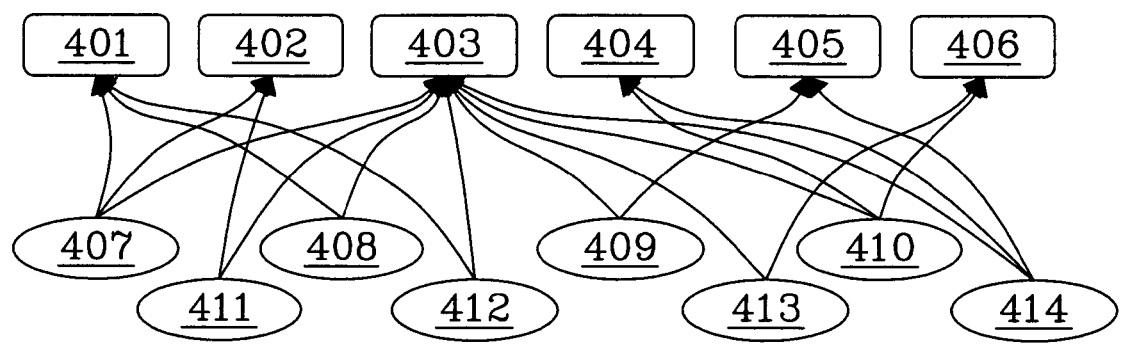
FIG. 4 is a directed acyclic graph (DAG) of the associations between knowledge nodes and hypothesis nodes in one embodiment of the present invention.

FIG. 4 shows a directed acyclic graph (DAG) diagram of the associations between knowledge nodes 407-414 and hypothesis nodes 401-406 according to one embodiment of the present invention. Each hypothesis node can analyze the characterizations provided by its associated knowledge nodes. Thus, each hypothesis node can evaluate specific abnormal network behaviors. Furthermore, the hypothesis nodes can weight the characterizations provided by the knowledge nodes according to a weighting factor. For example, prior network information can indicate that portscans, which are commonly employed by viruses, worms, P2P applications, and misconfigured systems, are commonly accompanied by a plurality of failed connection attempts. Therefore, the Portscan hypothesis node 401 can be associated with Failed Portscan Egress 407, Failed Connect Ingress 408, and Failed Connect Intranet 412 knowledge nodes each of which can have associated weighting factors that are applied by the Portscan hypothesis node during calculation of the confidence value. Similarly, P2P 402 application usage can be associated with Failed Connect Egress 407 and P2P Port 411 knowledge nodes. The values of the weighting factors can be derived from statistics and/or they can be defined from prior network knowledge by an administrator.

The instant embodiment further comprises Virus 404, MS Walk 405, SMTP Storm 406, and Alert (unknown) 403 hypothesis nodes. The Virus hypothesis 404 node can detect characteristics of a virus or worm attempting to propagate on a network and is associated with failed SMTP 410 and failed MSPorts 414 knowledge nodes. The MS walk hypothesis node 405 can detect users and/or systems attempting to exploit vulnerabilities on a Windows®-based computer. MS Walk is associated with success MSPorts 409 and failed MSPorts 414 knowledge nodes. The SMTP Storm hypothesis node 406 can detect behaviors associated with the transmission of viruses and/or spam through SMTP. The Alert (unknown) hypothesis node 403 is designed to alert on behaviors that do not fall into one of the other hypothesis nodes. It is associated with all the knowledge nodes and can be triggered by newly-learned attacks and events. Other hypothesis nodes and hypothesis-knowledge-node associations can be defined by administrators and can be based on prior network information. Thus, knowledge-hypothesis node associations are not limited to those shown by the embodiment in FIG. 4.

In one embodiment, the confidence value is calculated according to a modified Bayesian analysis approach. The knowledge nodes can characterize network behavior as being one of two possible states, either A or B. Each of the states would have an associated probability value, P(A) and P(B), assigned by the knowledge node. The hypothesis nodes, which are typically associated with at least two knowledge nodes, take into account all combinations of the characterizations assigned by those knowledge nodes as well as the weighting factors associated with those knowledge nodes to determine the confidence value. For example, consider a hypothesis node, Z, and two associated knowledge nodes, X and Y. Knowledge nodes X and Y can each characterize network behaviors as being in one of two states $x_0$ or $x_1$ and $y_0$ or $y_1$, respectively. Hypothesis node Z can also characterize the network behavior as being in one of two states $z_0$ or $z_1$, which can represent true or false validations of a hypothesis that a given network behavior is abnormal. The hypothesis node would have weighting factors [P(Z=z|X=x, Y=y)] for each combination of states, as represented in Table 10.

TABLE 10

Sample weighting factors for all combinations of
characterizations from knowledge nodes X and Y.

| X | Y | $P(Z = z_1 \mid X = x, Y = y)$ | $P(Z = z_0 \mid X = x, Y = y)$ |
|---|---|---|---|
| $x_0$ | $y_0$ | $a_1$ | $b_1$ |
| $x_0$ | $y_1$ | $a_2$ | $b_2$ |
| $x_1$ | $y_0$ | $a_3$ | $b_3$ |
| $x_1$ | $y_1$ | $a_4$ | $b_4$ |

In order to calculate the confidence value and make a determination regarding whether or not the network traffic is indeed abnormal, the hypothesis node, Z, calculates the probabilities that Z equals $z_0$ and $z_1$ according to equation 2.

$$P(Z = z) = \sum_{x=\{x_0, x_1\}, y=\{y_0, y_1\}} P(Z = z \mid X = x, Y = x) P(X = x) P(Y = y) \qquad \text{Eqn. 2}$$

Example

Detection of P2P Application Usage

Prior network information from a hypothetical network might indicate that the mean and standard deviation for failed TCP connections from the intranet to the internet in a time interval, T, is approximately 4 and 1.5, respectively. The failed connection attempts can be analyzed by the Failed Connect Egress knowledge node, for which the certainty intervals would be as follows (Table 11), according to equation 1.

TABLE 11

Certainty intervals and probabilities for hypothetical Failed Connect Egress
knowledge node. M is the measured value of failed connections per interval.
$P_m$ is the calculated percentage value for measured value M with respect to
known mean and standard deviation. Range is defined through
calculation of $C_{max}$ based on the $P_{max}$ desired below.

| | Certainty Range (%) | | | | | |
|---|---|---|---|---|---|---|
| | $P_m < 75$ | $75 < P_m < 90$ | $90 < P_m < 95$ | $95 < P_m < 99$ | $99 < P_m < 99.99$ | $P_m > 99.99$ |
| Range | $M < 5.7$ | $5.7 < M < 6.5$ | $6.5 < M < 7.0$ | $7.0 < M < 7.9$ | $7.9 < M < 10$ | $M \geq 10$ |
| Prob. (Node) | 0.5 | 0.55 | 0.6 | 0.7 | 0.8 | 0.9 |

If the value from a sensor detects 10 failed TCP connections from the intranet to the internet during the time interval, T, then the probability of a true failed connect egress is 0.9 (90%), which becomes the characterization assigned by the Failed Connect Egress knowledge node.

The TCP ports used for the 10 failed TCP connections might consist of the ports shown in Table 12. Table 12 also includes the probability associated with each port as determined by the P2P ports knowledge node. Ports which do not already exist in the characterization model of the P2P ports knowledge node are given a default value of 0.5, which represents a neutral opinion.

TABLE 12

Probabilities, according to the P2P ports knowledge node, for
ports on which hypothetical, failed connections were detected

| | Port | | | | | | | | | |
|---|---|---|---|---|---|---|---|---|---|---|
| | 33033 | 1645 | 80 | 1214 | 6257 | 1518 | 30000 | 2323 | 1645 | 33033 |
| Prob. | 0.95 | 0.95 | 0.4 | 0.9 | 0.5 | 0.5 | 0.5 | 0.5 | 0.95 | 0.95 |

Taking the sum of all probabilities and dividing by the number of failed connections results in a average probability value of 0.71 (71%). Accordingly, the characterization assigned by the P2P ports knowledge node is 71%.

The characterizations from the knowledge nodes associated with the P2P hypothesis node are summarized in Table 13.

TABLE 13

Summary of the characterizations assigned by
knowledge nodes, which knowledge nodes are
associated with the P2P hypothesis node.

| P(Failed Connect Egress = True) | P(Failed Connect Egress = False) | P(P2P Ports = True) | P(P2P Ports = False) |
|---|---|---|---|
| 0.9 | 0.1 | 0.71 | 0.29 |

Examples of the weighting factors associated with the Failed Connect Egress and P2P Ports knowledge nodes are shown in Table 14. According to the table, if the Failed Connect Egress characterization, X, is True and the P2P Ports characterization, Y, is True then the P2P hypothesis node's weighting factor is 0.9 for a true state and 0.1 for a false state.

TABLE 14

Examples of the weighting factors from
a hypothetical P2P hypothesis node.

| Failed Connect Egress (X) | P2P Ports (Y) | P(P2P = True\|X = x, Y = y) | P(P2P = False\|X = x, Y = y) |
|---|---|---|---|
| True | True | 0.9 | 0.1 |
| True | False | 0.3 | 0.7 |
| False | True | 0.8 | 0.2 |
| False | False | 0.5 | 0.5 |

The confidence of the P2P hypothesis node's confidence that the detected network behavior is indeed abnormal can be determined according to equation 2:

$$P(P2P = \text{True}) = \sum_{x=\{x_0,x_1\},y=\{y_0,y_1\}} P(P2P = \text{True} \mid X = x, Y = x) P$$

$$P(X = x)P(Y = y)$$

$$= P(\text{True} \mid \text{True}, \text{True})P(\text{True})P(\text{True}) +$$

$$P(\text{True} \mid \text{True}, \text{False})P(\text{True})P(\text{False}) +$$

$$= P(\text{True} \mid \text{False}, \text{True})P(\text{False})P(\text{True}) +$$

$$P(\text{True} \mid \text{False}, \text{False})P(\text{False})P(\text{False})$$

Substituting with the values in Tables 13 and 14 results in the following:

$$P(P2P = \text{True}) = (0.9)(0.9)(0.71) +$$

$$(0.3)(0.9)(0.21) + (0.8)(0.1)(0.71) + (0.5)(0.1)(0.29) = 0.70$$

Thus, the confidence value of the P2P hypothesis node is 0.70. This corresponds to a 70% confidence that the detected network behavior constitutes P2P application usage, which would be abnormal on the given network.

In one embodiment, the knowledge and hypothesis nodes only analyze unapproved network traffic. This can involve distinguishing between approved and unapproved traffic by defining "normal" relationships on a network. Classification of traffic as approved or unapproved can comprise creating policies to define network relationships. Examples of such policies can include those that classify traffic according to source-IP addresses, source ports, destination-IP addresses, destination ports, and/or protocols. Another policy can be based on the state of a connection in the network. Yet another policy can be based on traffic data flow including, but not limited to the direction and volume of the traffic. Policies can operate on single users and/or systems as well as on groups and/or network segments. Any traffic that is unapproved according to policies and/or is not defined by a policy is deemed abnormal by default. The traffic is then further examined by the knowledge and hypothesis nodes to confirm that the traffic is indeed abnormal.

One way to define network relationships is by source and destination data. For example, end user computers would likely have certain defined relationships with the mail servers. Thus, there will be a many-to-one relationship wherein all users interact with the mail servers. A sample policy regarding mail servers can specify that traffic having the characteristics shown in Table 15, is approved. Similar relationships can include, but are not limited to interactions with Domain Name Services on a network, with web servers, and with database servers.

TABLE 15

An example of characteristics defined in a policy describing
approved traffic with a hypothetical mail server.

| Source IP Address | 192.168.X.X |
|---|---|
| Source Port | X |
| Destination IP Address | 192.168.1.20 |
| Destination Port | 25 |
| Protocol | TCP |

Figure 5A:
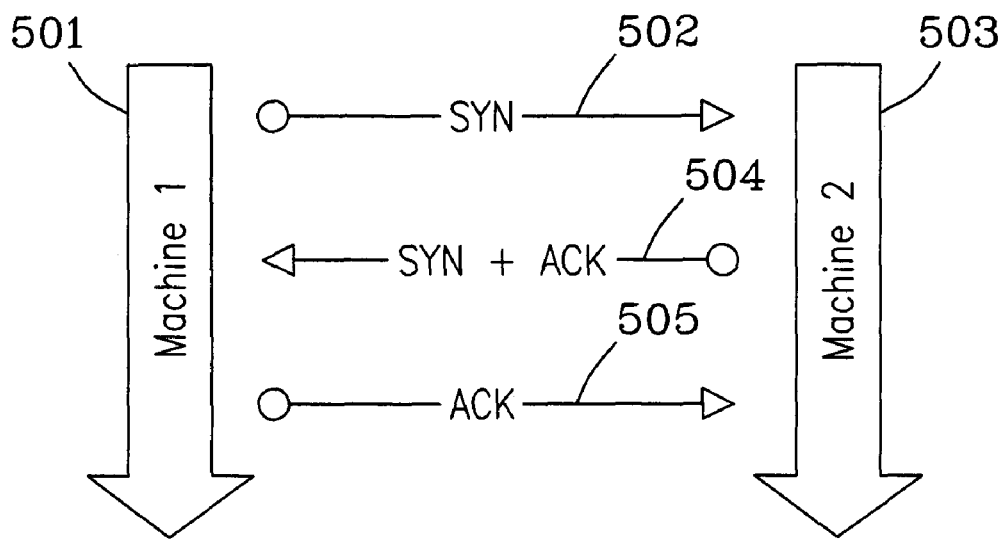
FIGS. 5(a)-5(d) are diagrams showing examples of connection states between machines.

The state of a connection can also be used to characterize traffic. For example, TCP can be considered a connection-related protocol that allows one to track the different states of connections and classify traffic based on those states of connections. Referring to FIG. 5(a), During a typical, successful TCP connection process, Machine 1 501, sends a SYN packet 502 to the port and IP address of Machine 2 503. If the port is open and able to accept connections, then Machine 2 503 responds with a SYN+ACK packet 504. Once Machine 1 501 receives the SYN+ACK packet 504, it responds to Machine 2 503 with an ACK packet 505. Once this "three-way" handshake is complete, the connection can be considered "fully open."

Figure 5B:
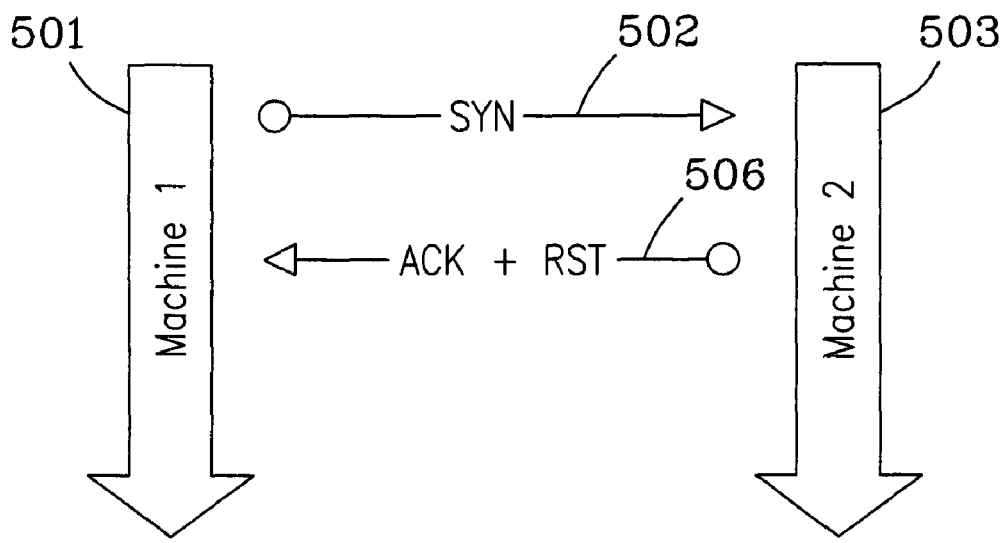
Figure 5C:
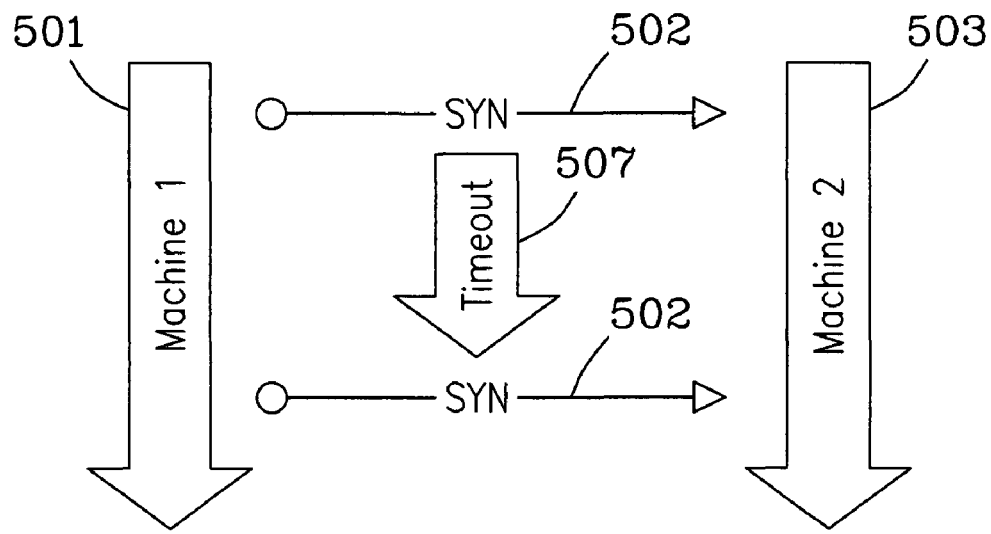

FIG. 5(b) depicts a scenario in which a connection attempt is rejected. Machine 1 501 attempts to connect to the IP address and port of Machine 2 503 by sending an SYN packet 502. Machine 2 503 determines that the connection should not be allowed and sends an ACK+RST packet 506 to deny the connection. Referring to FIG. 5(c), another unsuccessful connection can result when Machine 1 501 attempts to connect to a port or service that doesn't exist on a system and/or a system that is behind a firewall. In such an instance, Machine 1 501 might never receive a response to its initial SYN packet 502. Therefore, the traffic may comprise a plurality of SYN packets 502 originating from Machine 1 501 and a timeout 507 between the SYN packets. This type of activity can often be an indication of abnormal network behavior such as portscans.

Figure 5D:
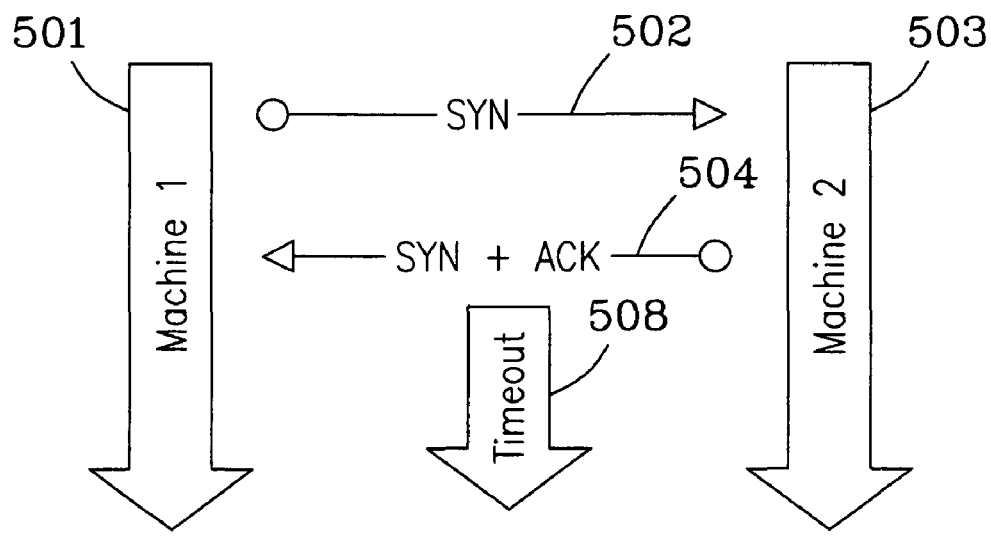

FIG. 5(d) depicts a "half-open" connection, which can be associated with service and/or system probes or even with attempts at a denial of service attack. Half-open connections can be established when Machine 1 501 sends a SYN packet 502 and Machine 2 503 responds with a SYN+ACK packet 504. However, Machine 1 501 does not complete the third portion of the handshake and never sends an ACK packet to Machine 2 503. Instead, the connection attempt times out 508, resulting in a SYN+ACK+TIMEOUT situation.

Figure 6A:
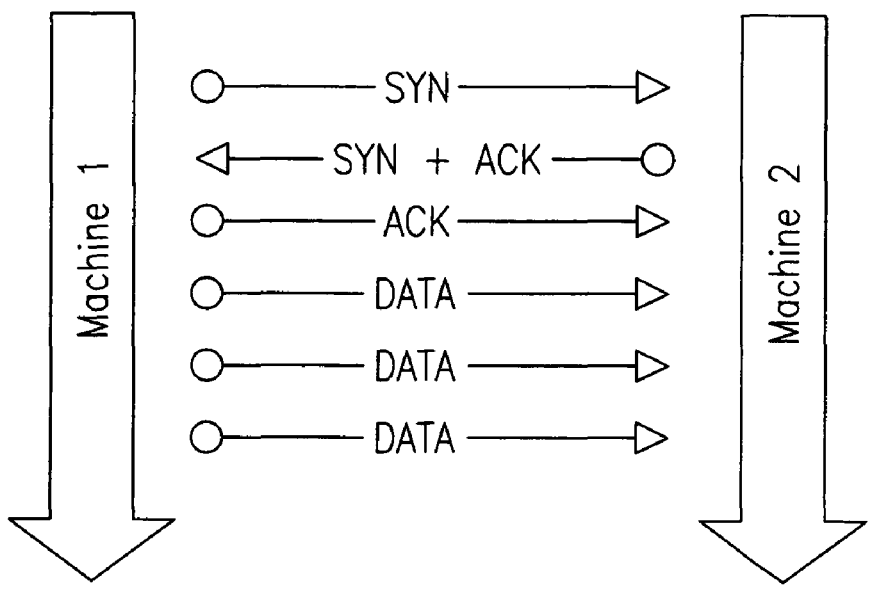
FIGS. 6(a)-6(d) are diagrams showing examples of connection states between machines.
Figure 6B:
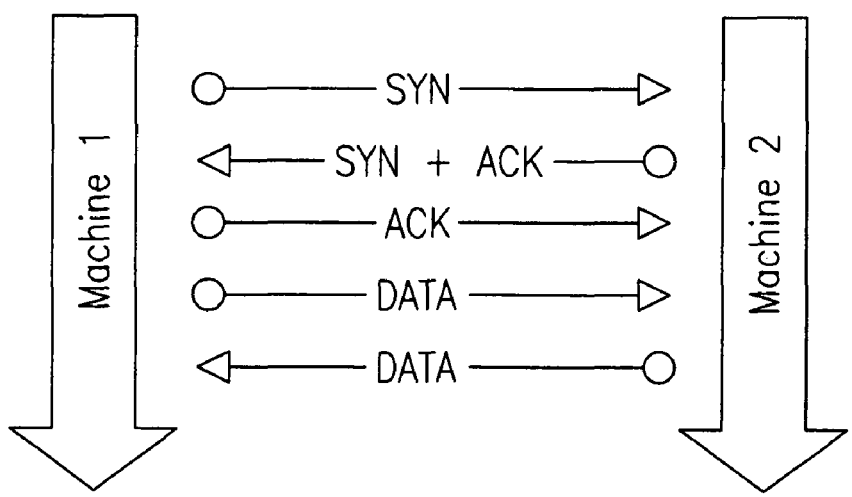
Figure 6C:
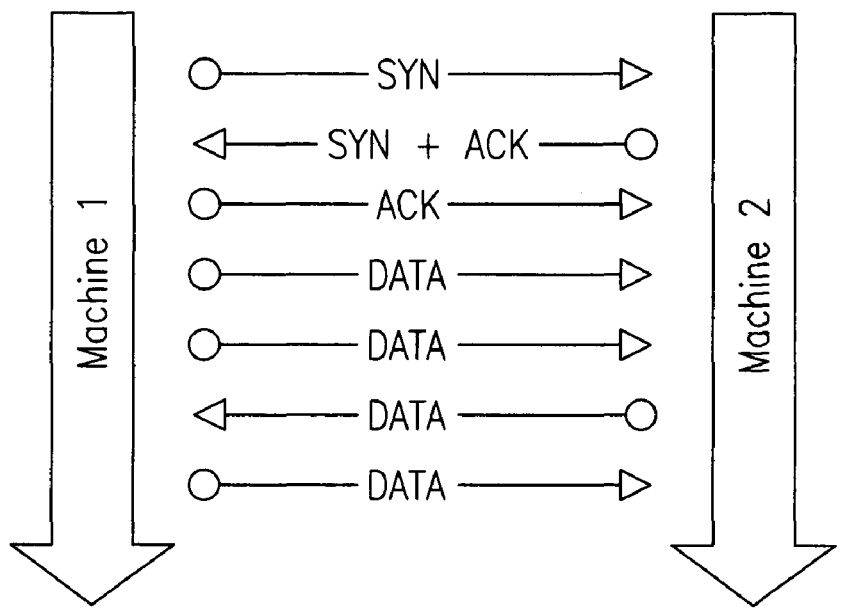
Figure 6D:
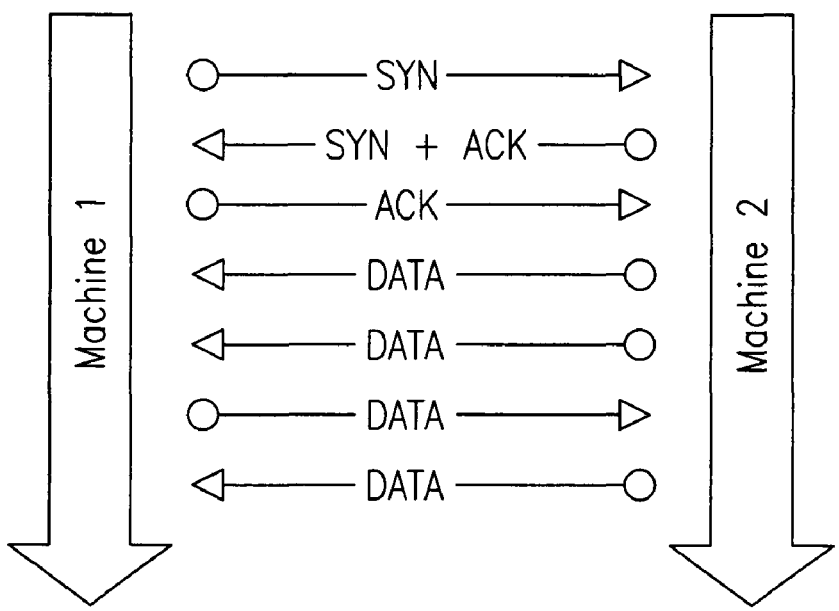

Another aspect of TCP connections that can be used for traffic classification comprises the flow of data in successful connections. FIG. 6(a) depicts and example of unidirectional data flow, while FIG. 6(b) depicts bidirectional data flow. FIGS. 6(c) and (d) show examples of bidirectional data flow wherein the flow is source-weighted and destination-weighted, respectively.

Figure 7A:
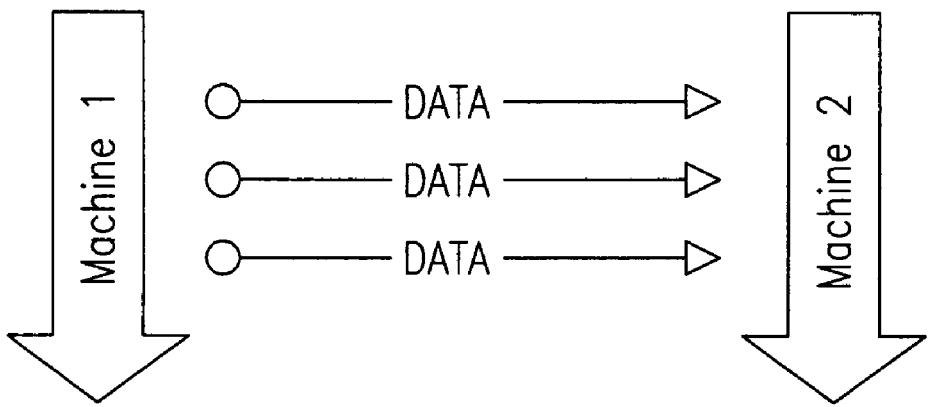
FIGS. 7(a)-7(d) are diagrams showing examples of connection states between machines.
Figure 7B:
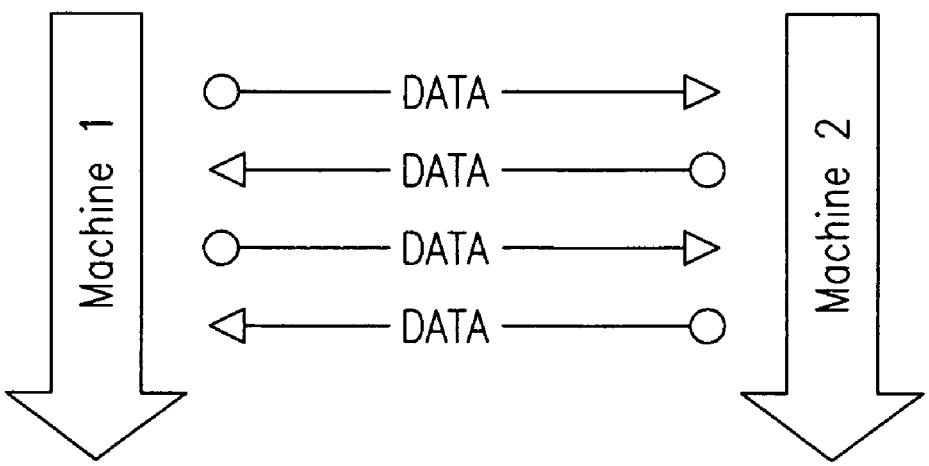
Figure 7C:
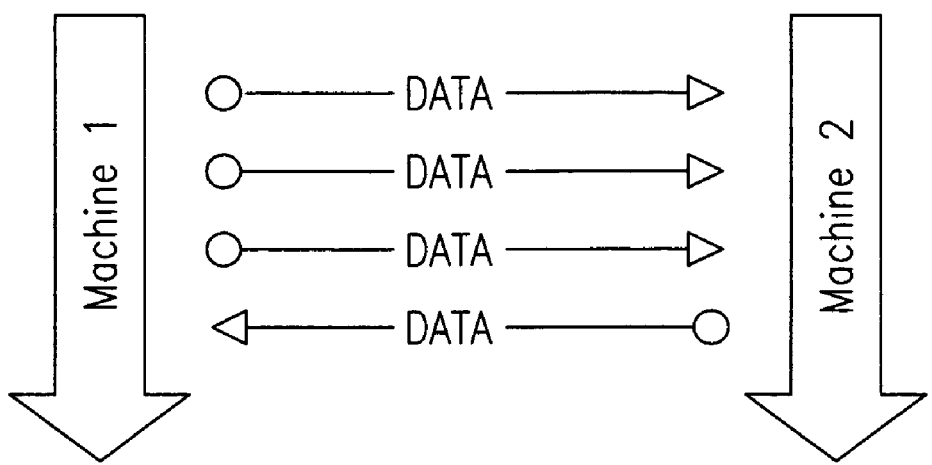
Figure 7D:
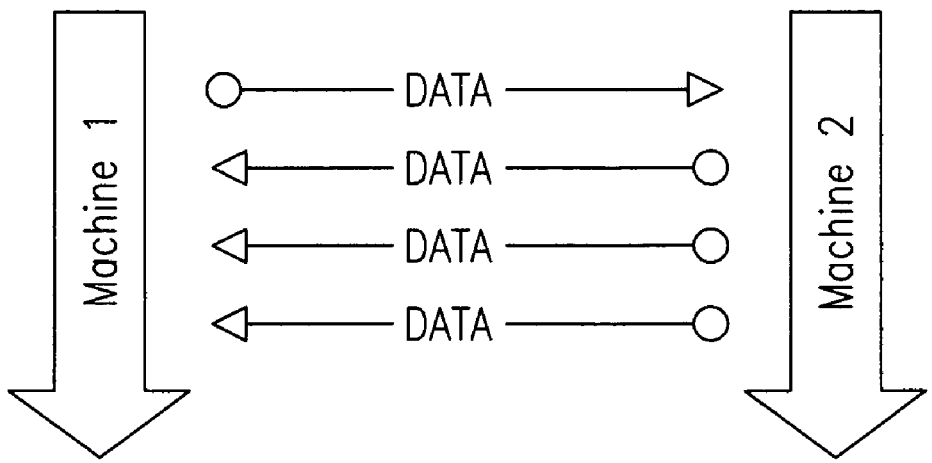

Connection information from user datagram protocol (UDP) can also be used when classifying traffic. Data that flows in one direction over UDP, as shown in FIG. 7(a), can be considered unidirectional, wherein the receiving system, most likely, did not provide a service to the sending system. However, referring to FIGS. 7(b)-(d), when bidirectional UDP traffic exists, it can be assumed that a valid connection exists between the involved machines. In FIGS. 7(b)-(d), the data flow can be considered to be bidirectional, bidirectional source weighted, and bidirectional destination weighted, respectively, wherein the source is considered to be the machine that first sends data and the destination is considered to be the machine that responds to the initial UDP packet from the source.

The connection states described above are intended to serve as examples and should not limit the scope of the invention. Generally speaking, characterizations of connection states can be used to refine existing classifications and/or make new classifications based on those states. For instance, in the mail server example described above, TCP connection characteristics can be used to further classify the policy summarized in Table 15, an example of which is provided in Table 16.

TABLE 16

An example of the use of connection state information to further classify the policy summarized in Table 15.

| Policy | Classification | Comments |
|---|---|---|
| Source IP = 192.168.X.X<br>Source port = X<br>Destination IP = 192.168.1.20<br>Destination port = 25<br>Protocol TCP | Approved | Example policy as described in Table 15. No connection state information. |
| Source IP = 192.168.X.X<br>Source port = X<br>Destination IP = 192.168.1.20<br>Destination port = 25<br>Protocol TCP<br>Connection State = SYN sent | Approved | Connection attempted |
| Source IP = 192.168.X.X<br>Source port = X<br>Destination IP = 192.168.1.20<br>Destination port = 25<br>Protocol TCP<br>Connection State = SYN sent + TIMEOUT | Unapproved | Connection failed |
| Source IP = 192.168.X.X<br>Source port = X<br>Destination IP = 192.168.1.20<br>Destination port = 25<br>Protocol TCP<br>Connection State = SYN + ACK | Approved | Connection accepted |
| Source IP = 192.168.X.X<br>Source port = X<br>Destination IP = 192.168.1.20<br>Destination port = 25<br>Protocol TCP<br>Connection State = SYN + ACK + TIMEOUT | Unapproved | Half-open connection |
| Source IP = 192.168.X.X<br>Source port = X<br>Destination IP = 192.168.1.20<br>Destination port = 25<br>Protocol TCP<br>Connection State = SYN sent ACK + RST | Unapproved | Connection rejected |

Thus, traffic that was approved by the policy summarized in Table 15 can be further refined by the addition of connection state information. Similarly, traffic data flow characteristics can be used to further increase the granularity of the classification. For example, when a machine establishes a connection to the mail server, it is typically sending mail. Thus, the connection should comprise source-weighted data flow wherein the client machine sends most of the data. The data flow could also comprise bidirectional traffic, but would rarely be unidirectional. Thus, the policy could be further refined by specifying that unidirectional flow is unapproved. Any traffic categorized as unapproved can then be assigned a characterization by a knowledge node and evaluated by a hypothesis node as described earlier.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method for detecting abnormal network traffic comprising:
   providing at least one knowledge node comprising a characterization model utilizing decision-making techniques from engineering statistics based on prior network information and not based on fixed thresholds or signatures;
   assigning characterizations of network behaviors according to the characterization models of the at least one knowledge nodes; and
   calculating a confidence value quantifying the degree of confidence that the network behaviors constitute abnormal traffic, the confidence value being based on the characterizations from the at least one knowledge node and on weighting factors associated with the knowledge nodes;
   wherein said assigning and said calculating are executed by a processing device.

2. The method as recited in claim 1, wherein each knowledge node is associated with at least one network behavior.

3. The method as recited in claim 1, prior to the assigning step, further comprising the step of detecting network events by network sensors.

4. The method as recited in claim 3, wherein the network sensors are selected from the group consisting of signature-based sensors, network anomaly sensors, protocol anomaly sensors and combinations thereof.

5. The method as recited in claim 1, prior to the assigning step, further comprising the step of classifying network traffic as approved or unapproved.

6. The method as recited in claim 5, wherein the classifying is based on source data, destination data, connection state, traffic data flow, or combinations thereof.

7. The method as recited in claim 5, wherein the network behaviors comprise unapproved network traffic.

8. The method as recited in claim 1, further comprising the step of logging the network behaviors.

9. The method as recited in claim 1, further comprising the step of performing a security action when the confidence value is greater than or equal to an alert value.

10. The method as recited in claim 9, wherein the security action is notifying administrators, collecting forensic data, establishing a quarantine for offending systems, transferring offending systems to a virtual network, suspend user access, or a combination thereof.

11. The method as recited in claim 1, wherein the knowledge nodes are selected from the group consisting of failed connect egress, failed connect ingress, success MSPorts, failed SMTP, P2P ports, failed connect intranet, and success SMTP.

12. The method as recited in claim 1, wherein the calculating step is performed by hypothesis nodes.

13. The method as recited in claim 12, wherein hypothesis nodes are selected from the group consisting of portscan, P2P, unknown alert, virus, MS walk, and SMTP storm.

14. The method as recited in claim 1, further comprising the step of refining the knowledge nodes according to the accumulation of said prior network information and administrator feedback.

15. The method as recited in claim 1, wherein the calculating step is based on a modified Bayesian analysis model.

16. A system for detecting abnormal traffic comprising:
   a. sensors to detect network events, wherein a network behavior comprises at least one network event;
   b. a program on a computer-readable medium, the program comprising:
      i. at least one knowledge node assigning characterizations of network behaviors, each knowledge node comprising a characterization model utilizing decision-making techniques from engineering statistics based on prior network information and not based on fixed thresholds or signatures;
      ii. at least one hypothesis node calculating a confidence value based on the characterizations from the at least one knowledge node, each hypothesis node comprising a weighting factor for associated knowledge nodes, the confidence value comprising a quantification of the degree of confidence that the network behaviors constitute abnormal network traffic; and
   c. a processing device to execute the program.

17. The system as recited of claim 16, wherein the sensors are selected from the group of sensors consisting of signature-based sensors, network anomaly sensors, protocol anomaly sensors and combinations thereof.

18. The system as recited in claim 16, wherein each knowledge node is associated with at least one network behavior.

19. The system as recited in claim 16, further comprising means for aggregating a plurality of network events.

20. The system as recited in claim 16, further comprising means for performing security actions in response to abnormal network traffic.

21. The system as recited in claim 16, further comprising means for logging network behaviors.

22. The system as recited in claim 16, further comprising means for refining the knowledge nodes according to the accumulation of said prior network information.

* * * * *